(12) United States Patent
Craft et al.

(10) Patent No.: US 7,950,019 B2
(45) Date of Patent: May 24, 2011

(54) METHOD AND APPARATUS FOR CHECKPOINT AND RESTARTING A STREAM IN A SOFTWARE PARTITION

(75) Inventors: David Jones Craft, Austin, TX (US); Rajeev Mishra, Karnataka (IN); Lance Warren Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 11/751,505

(22) Filed: May 21, 2007

(65) Prior Publication Data

US 2008/0295111 A1 Nov. 27, 2008

(51) Int. Cl.
 G06F 9/44 (2006.01)
 G06F 11/16 (2006.01)
(52) U.S. Cl. .......................................... 719/313; 714/12
(58) Field of Classification Search ........................ None
 See application file for complete search history.

(56) References Cited

U.S. PATENT DOCUMENTS

| | | | |
|---|---|---|---|
| 5,539,885 A | 7/1996 | Ono et al. | |
| 5,724,512 A | 3/1998 | Wineerbottom | |
| 5,884,021 A | 3/1999 | Hirayama et al. | |
| 6,795,966 B1 | 9/2004 | Lim et al. | |
| 6,963,923 B1 | 11/2005 | Bennett | |
| 7,024,467 B2 | 4/2006 | Rosensteel, Jr. et al. | |
| 7,039,663 B1 | 5/2006 | Federwisch et al. | |
| 7,076,555 B1 | 7/2006 | Orman et al. | |
| 7,082,551 B2 | 7/2006 | Lawrance et al. | |
| 7,099,866 B1 | 8/2006 | Crosbie et al. | |
| 7,272,654 B1 | 9/2007 | Brendel | |
| 7,373,468 B1* | 5/2008 | Gupta | 711/162 |
| 7,505,410 B2 | 3/2009 | Lakshmanamurthy et al. | |
| 2002/0174379 A1* | 11/2002 | Korenevsky et al. | 714/19 |
| 2004/0250124 A1 | 12/2004 | Chesla et al. | |
| 2005/0262411 A1 | 11/2005 | Vertes et al. | |
| 2005/0276548 A1 | 12/2005 | Fu et al. | |
| 2006/0041786 A1 | 2/2006 | Janakiraman et al. | |
| 2006/0184587 A1 | 8/2006 | Federwisch et al. | |

(Continued)

FOREIGN PATENT DOCUMENTS

FR 2843210 6/2004

(Continued)

OTHER PUBLICATIONS

USPTO office action for U.S. Appl. No. 11/751,482 dated Dec. 24, 2009.

(Continued)

*Primary Examiner* — Hyung S Sough
*Assistant Examiner* — Abdou K Seye
(74) *Attorney, Agent, or Firm* — Yee & Associates, P.C.; Matthew W. Baca

(57) ABSTRACT

A computer implemented method, apparatus, and computer program product for a checkpoint process associated with a device driver in a workload partitioned environment. In response to initiation of a checkpoint process, a stream is frozen. The stream comprises a set of kernel modules driving a device. Freezing the stream prevents any module in the set of kernel modules from sending any messages, other than a checkpoint message, to another module in the set of kernel modules. The message block for each module in the set of kernel modules is updated with internal data to form a restart message. The internal data is data describing a state of the module in the set of kernel modules.

14 Claims, 6 Drawing Sheets

U.S. PATENT DOCUMENTS

2007/0244962 A1    10/2007    Laadan et al.

FOREIGN PATENT DOCUMENTS

| FR | 2872605 | 6/2004 |
|---|---|---|
| WO | WO2004015513 | 2/2004 |
| WO | WO2006010812 | 2/2006 |

OTHER PUBLICATIONS

"A Checkpoint and Restart mechanism for parallel programming systems—Messages and Queues", Sameer Paranjpye, pp. 1-4, retrieved May 14, 2007 http://charm.cs.uiuc,edu/papers/SameerThesis.www/node13.html.

"Solaris Internals: Solaris 10 and OpenSolaris Kernel Architecture", Second Edition, retrieved Mar. 20, 2007. http://safari5.bvdep.com/0131482092/ch14lev1sec9.

"The Single UNIX Specification, Version 2, 1997", The Open Group, retrieved Mar. 20, 2007 http://opengroup.org/onlinepubs/007908799/xsh/fchdir.html.

Hutzelman, "[OpenAFS]MailDir & Coda/AFS was: Practical No. of files per dir was: [OpenAFS] Max number of files in volume?", retrieved Mar. 20, 2007 http://www.openafs.org/pipermail/openafs-info/2004-May/013499.html.

Ryabkov, "filesystem implementation questions", retrieved Mar. 20, 2007 http://lists.freebsd.org/pipermail/freebsd-hackers/2005-August/013133.html.

"Linux/Unix Information about the Linux/Unix chdir command" retrieved Mar. 20, 2007 http://www.computerhope.com/unix/uchdir.htm.

USPTO final office action for U.S. Appl. No. 11/751,482 dated Jun. 11, 2010.

Krishnan et al., "Checkpoint and Restart for Distributed Components in XCAT3", Proceedings of the Fifth IEEE/ACM International Workshop on Grid Computing (GRID'04), 2004, pp. 281-288.

Sancho et al., "Current Practice and a Direction Forward in Checkpoint/Restart Implementations for Fault Tolerance", Proceedings of the 19th IEEE International Parallel and Distributed Processing Symposium (IPDPS), Workshop 18, vol. 19, 2005, pp. 1-8.

Zhong et al., "CRAK: Linux Checkpoint/Restart As a Kernel Module", Network Computing Lab, Columbia University, Technical Report CUCS-014-01, Nov. 2001, pp. 1-19 http://www.ncl.cs.columbia.edu/researching/migrate/crak.html.

\* cited by examiner

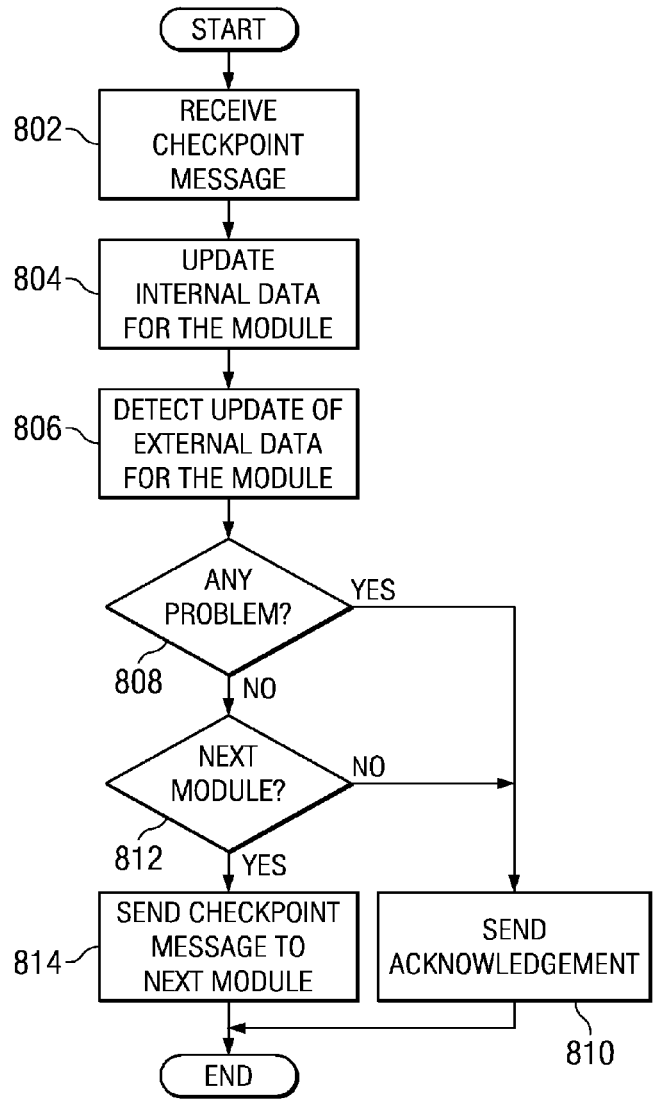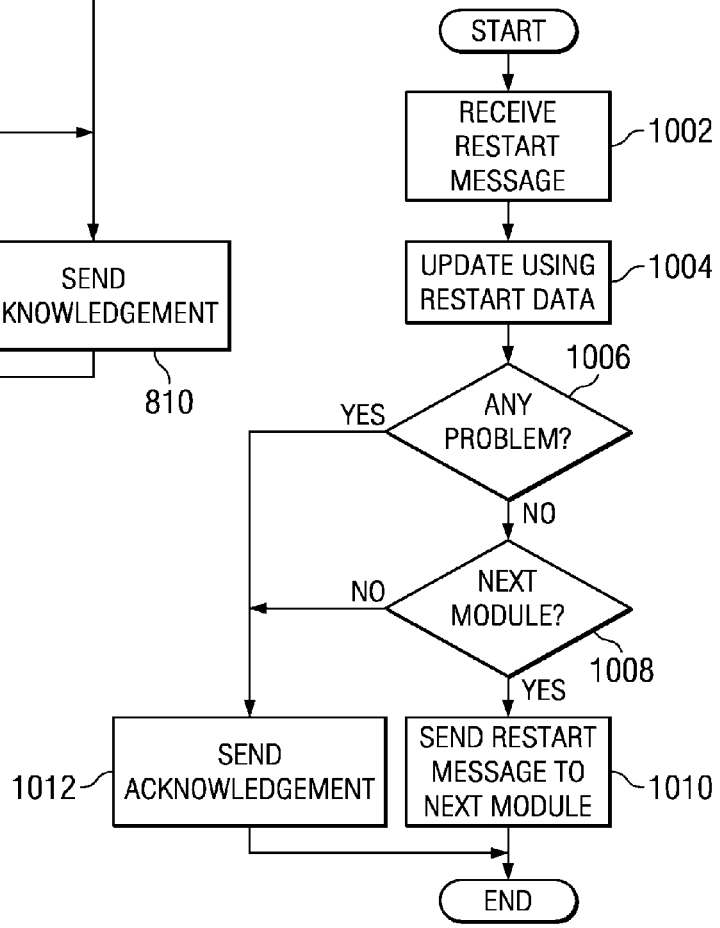

METHOD AND APPARATUS FOR CHECKPOINT AND RESTARTING A STREAM IN A SOFTWARE PARTITION

BACKGROUND OF THE INVENTION

1. Field of the Invention

The present invention is related generally to a data processing system and in particular to a method and apparatus for checkpoint operations. More particularly, the present invention is directed to a computer implemented method, apparatus, and computer usable program code for checkpointing and restarting modules in a workload partitioned environment.

2. Description of the Related Art

A workload partition is a virtualized operating system environment within a single instance of the operating system. A workload partition may also be referred to as a software partition. A single instance of the operating system can be partitioned into multiple virtual operating system environments. Each of these virtual operating system environments is known as a workload partition. An example of a workload partition is AIX® workload partition (WPAR), which is a product available from International Business Machines (IBM®) Corporation.

Software running within each workload partition will appear to have its own separate instance of the operating system. A workload partition may include one or more processes. Processes in a workload partition are completely isolated from processes in other workload partitions in the same system. They are not allowed to interact with processes in other workload partitions in the same system.

A workload partition, including any applications or other processes running in the partition, may be migrated from one physical computing device to another physical computing device, while still active. In other words, migration of software partitions allows a user to move a set of active applications from one computing device to a different computing device. In this manner, a user can target a selected set of applications to move to the different computing device without transferring all applications running on the computing device.

Migration of a software partition involves checkpointing the state of every application process in the workload partition that is to be moved from one computing device to form checkpoint data. Then the state of every targeted application process in the migrated workload partition may be restored on the different computing device using the checkpoint data.

A checkpoint operation is a data integrity operation in which the application state for an application process running on the kernel are written to stable storage at particular time points to provide a basis upon which to recreate the state of an application in the event of a failure and/or migration of the application to another data processing system.

During a checkpoint operation, an application's state and data may be saved onto a local disk or a network disk at various pre-defined points in time to generate checkpoint data. When a failure occurs in the data processing system and/or when the application is migrated to a different data processing system, a restart operation may be performed using the checkpoint data to restore the state of the application to the last checkpoint. In other words, the application data may be restored from the checkpoint values stored on the disk.

SUMMARY OF THE INVENTION

The illustrative embodiments provide a computer implemented method, apparatus, and computer usable program code for a checkpoint process associated with a device driver in a workload partitioned environment. In one embodiment, A stream is frozen in response to initiation of a checkpoint process in a workload partition in the workload partitioned environment. The stream comprises a set of kernel modules driving a device. Freezing the stream prevents any module in the set of kernel modules from sending any messages, other than a checkpoint message, to another module in the set of kernel modules. The message block for each module in the set of kernel modules is updated with internal data to form a restart message. The internal data is data describing a state of the module in the set of kernel modules. The restart message is used to restart or restore the stream and the set of kernel modules when the workload partition is migrated to a different data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart illustrating a process for a module updating checkpoint data in a checkpoint message in accordance with an illustrative embodiment;

FIG. 10 is a flowchart illustrating a process for a module using checkpoint data in a restart message to restore the module in accordance with an illustrative embodiment.

DETAILED DESCRIPTION OF THE PREFERRED EMBODIMENT

Figure 1:
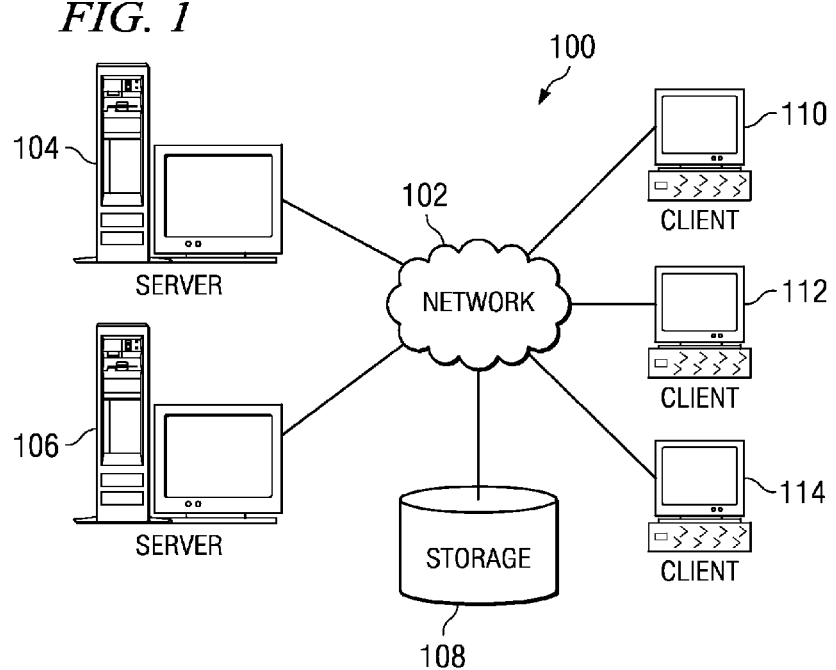
FIG. 1 is a pictorial representation of a network of data processing systems in which illustrative embodiments may be implemented.
Figure 2:
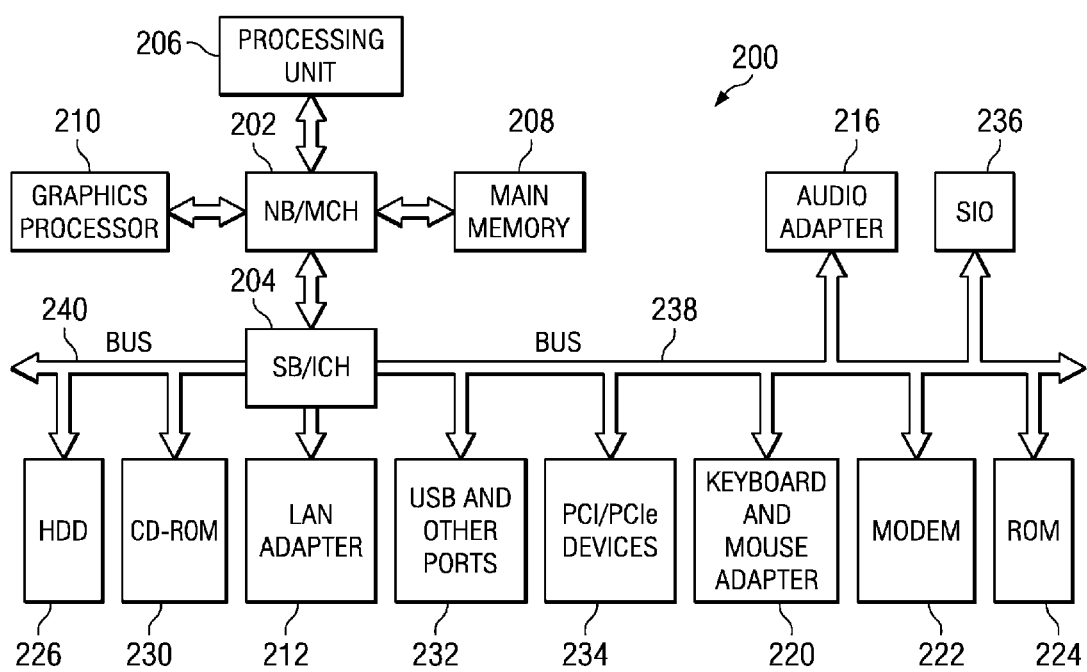
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Server 104 or server 106 may be referred to as a node in data processing system 100. Server 104 and server 106 support a workload partitioned environment. In other words, server 104 and server 106 may optionally support one or more workload partitions.

In addition, clients 110, 112, and 114 connect to network 102. These clients 110, 112, and 114 may be, for example, personal computers or network computers. Client 110, client 112, and/or client 114 may be referred to as nodes in data processing system 100. Clients 110, 112, and 114 also support workload partitioned environments. Therefore, clients 110, 112, and 114 may also optionally support one or more workload partitions. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In this example, server 104 supports a workload partition having one or more applications running in the workload partition. The workload partition is being migrated to client 110. In one embodiment, prior to migration of the workload partition, a checkpoint process initiates the gathering and saving of checkpoint data regarding the state of all applications running in the workload partition being migrated to a state file on any type of storage device, such as storage unit 108.

However, in another embodiment, state data is not saved to a state file. In this example, a departure server, such as server 104, transmits the state file directly to an arrival server, such as server 106. An arrival server is the server onto which the migrating workload partition is moved. In other words, during migration of a workload partition, the workload partition is migrated or moved from a departure server to an arrival server. In this case, the state file is never saved on storage unit 108.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A workload partition is a virtualized operating system environment within a single instance of the operating system. A single instance of the operating system can be partitioned into multiple virtual operating system environments. Each of these virtual operating system environments is known as a workload partition. An example of a workload partition is AIX® workload partition (WPAR), which is a product available from International Business Machines (IBM®) Corporation.

Software running within each workload partition will appear to have its own separate instance of the operating system. A workload partition may include one or more processes. Processes in one workload partition are completely isolated from processes in other workload partitions on the same data processing system. They are not allowed to interact with processes in other workload partitions.

A workload partition, including any processes running in the partition, may be migrated from one physical computing device to another physical computing device while still active. The processes and/or other content of a workload partition may also be migrated into another workload partition on the same physical computing device.

Migration of a software partition involves check-pointing the state of every process in the partition on a first data processing system and then restoring the state of every process on a second partition using the checkpoint data. As used herein, the second partition may be a different partition located on the first data processing system or a different partition located on a different data processing system than the first data processing system.

A checkpoint operation is a data integrity operation in which the state of applications running in the workload partition and the state of the operating system are written to a data storage at a particular time to provide a basis upon which to recreate the state of a set of application processes running in a workload partition, such as when a workload partition is migrated from one physical computing device to another physical computing device.

The data storage may be a stable storage, such as non-volatile memory. However, the data storage may also include non-stable or non-volatile memory. A set of application processes may include one or more application processes. The process by which the state of the set of application processes, device drivers, and the operating system associated with a workload partition are written to stable storage may be referred to as a checkpoint.

During execution of an application, the application frequently needs to communicate with one or more devices. The device may be a hardware device. For example, the application may be sending output to a hardware display device like a monitor, a printer, or a network device for transmission of the output over the network.

In another embodiment, the device is a pseudo device or a virtualized device. When an application needs to communicate with or utilize a device, the application utilizes a device driver. A device driver is a software component that acts as an interface between the application and the device. The illustrative embodiments recognize that to migrate the set of currently running applications associated with a workload partition, it is necessary to checkpoint the state of the device driver associated with any application process in the workload partition. However, currently, a user cannot checkpoint the state of a device driver associated with an application running in a workload partition. Moreover, state data saved during a current checkpoint operation does not provide the necessary data for restoring the state of a device driver associated with an application running in the workload partition. In other words, the state of applications and device drivers associated with the applications in a workload partition cannot be restored during or after migration of the workload partition using state data gathered by currently available checkpoint processes.

Thus, the illustrative embodiments provide a computer implemented method, apparatus, and computer program product for a checkpoint process associated with a device driver in a workload partitioned environment. In response to a checkpoint process being initiated, a stream between a set of kernel modules associated with a device driver is frozen. Freezing the stream prevents any module in the set of kernel modules from sending any message except a checkpoint message to another module in the set of kernel modules. The message block for each module in the set of kernel modules is updated with internal data to form a restart message. The internal data is data regarding a state of the module in the set of kernel modules. The restart message is used to restart the stream and the set of kernel modules when the workload partition is migrated to a different data processing system.

The illustrative embodiments in FIGS. 3-10 are described as being implemented in a data processing system utilizing a device driver having a stream architecture. However, the illustrative embodiments are not limited to implementation in a device driver having a stream architecture. For example, the illustrative embodiments may also be implemented in any type of device driver, including, without limitation, a network driver interface specification (NDIS) architecture. In addition, the illustrative embodiments may also be implemented in a storage device, such as storage unit 108 in FIG. 1.

Figure 3:
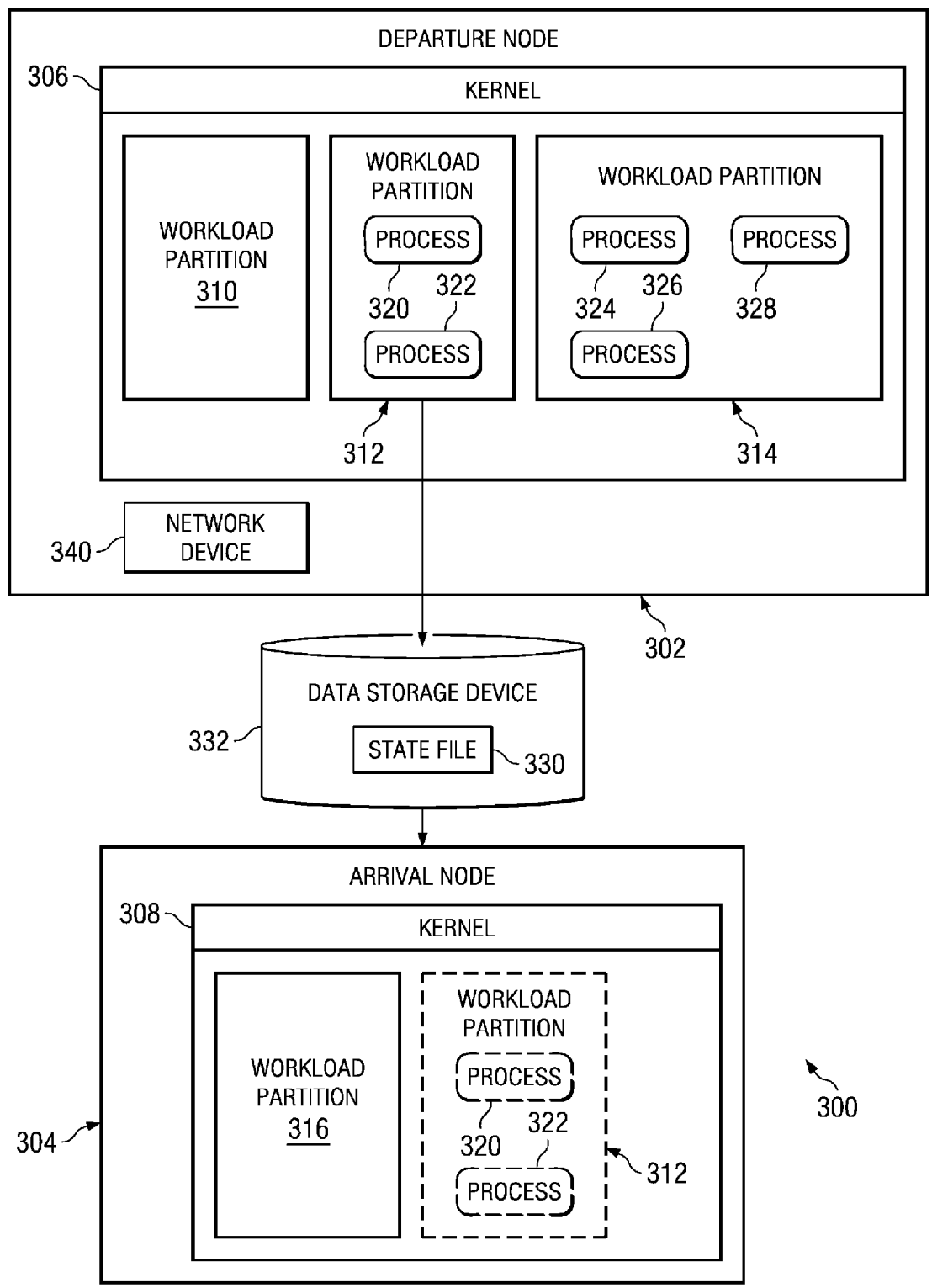
FIG. 3 is a block diagram illustrating a checkpoint process for checkpointing state data during the migration of a workload partition in accordance with an illustrative embodiment.

FIG. 3 is a block diagram illustrating a checkpoint process for checkpointing state data during the migration of a workload partition in accordance with an illustrative embodiment. Data processing system 300 may be implemented in any type of network data processing system, including, without limitation, data processing system 100 in FIG. 1.

Departure node 302 and arrival node 304 are computing devices supporting a workload partitioned environment, such as client 110 or server 104 in FIG. 1. Departure node 302 is the data processing system on which the workload partition is located before migration. Arrival node 304 is the computing device on which the workload partition is located after migration. When a workload partition is migrated, it "departs" from departure node 302 and "arrives" on arrival node 304. Departure node 302 and arrival node 304 may be implemented in any type of computing device, such as, but not limited to, server 104 or client 110 in FIG. 1.

Kernel 306 and kernel 308 are software processes for managing resources on data processing system 300, such as, without limitation, processor resources, input and output (I/O) resources, and memory resources on a computing device. In other words, kernel 306 is an abstraction layer between hardware and software on departure node 302 and kernel 308 is an abstraction layer between hardware and software on departure node 304.

Departure node 302 includes one or more software workload partitions for partitioning the operating system image within kernel 306 into multiple virtual operating system instances. The operating system may be any type of operating system, such as, without limitation, a UNIX® operating system, a LINUX® operating system, or an AIX® operating system. In this example, the operating system is an AIX® operating system.

In this example, departure node 302 includes workload partitions 310-314. Arrival node 304 includes workload partition 316. However, a computing device having a workload partitioned environment, such as departure node 302, is not limited to supporting only three workload partitions. In accordance with the illustrative embodiments, a computing device, such as departure node 302 or arrival node 304, may include any number workload partitions in accordance with the illustrative embodiments.

Each workload partition may include one or more processes. A process is an executing instance of an application, a task, or an operation being performed on data. In other words, a process is an executing instance of an application that is executing the instructions in a computer program. In this example, workload partition 312 includes processes 320-322 and workload partition 314 includes processes 324-328. In this example, one or more processes in processes 324-328 is utilizing a device driver to communicate and/or utilize a device. The device driver may be attempting to communicate with the device, already in the process of communicating with the device, and/or in the process of terminating communications with the device when the checkpoint operation is performed. As used herein, the device may be a hardware device, a pseudo device, or a virtualized device.

For example, if process 324 wants to send data to a device, such as a printer device for output of the data on a paper medium, process 324 utilizes a device driver associated with the printer to communicate the output to the printer and initiate the printing operation.

If a user wants to migrate workload partition 312 from departure node 302 to arrival node 304, a checkpoint process (not shown) associated with each process running on workload partition 312 must first save state data for each process and any device driver being utilized by a process to state file 330 on data storage device 332.

When an application needs to communicate with or utilize a device, the application utilizes a device driver (not shown). A device driver is a software component that acts as an interface between the application and the device. The illustrative embodiments recognize that to migrate the set of currently running applications associated with a workload partition, it is necessary to checkpoint the state of the device driver associated with any application process in the workload partition.

A checkpoint process is a software component for a given process that gathers process state data, data regarding open files and open sockets bound to the process, and any other information regarding the current state of a process in workload partition 312 and the state of any device driver being utilized by a process in workload partition 312. The state data may then be used to recreate or re-establish each process running in workload partition 312 to the same state that existed at the time the checkpoint process gathered the checkpoint data.

When the checkpoint operation begins, process 324 may have just sent the output to the device driver but the device driver did not yet send the output to the printer, the device driver may have already sent the output to the printer which may be in the process of spooling the output and/or printing the output, or the printer may have already received all of the data from the device driver in the printer buffer and the device driver is terminating communications with the printer.

A device driver having a stream architecture is implemented as a set of modules in the kernel that transfer messages between the application and the device by passing messages in a chain from one module to another. The set of modules in the kernel are also referred to herein as a set of kernel modules. The set of kernel modules includes a single module, as well as two or more modules. A module is a software component that may perform a particular function with regard to data that is received by the module or sent from the module to the application, the device, or another module in the chain. A stream architecture drives terminal interfaces in an operating system, such as, without limitation, AIX® or UNIX®. A terminal is a driver component, such as a display device, a printer, or a network device. The terminal may also be a pseudo or virtual device. A device driver having a stream architecture is discussed in greater detail in FIG. 4 below.

The illustrative embodiments recognize that the modules in a device driver are constantly sending messages back and forth between the modules in the chain of modules. After a module sends a message to an intended recipient module in the chain but before the message reaches the intended recipient, the message is an in-flight message. Therefore, the checkpoint process of the illustrative embodiments gathers state data for internal state of all device driver modules and the state of all in-flight messages associated with the device driver.

Figure 4:
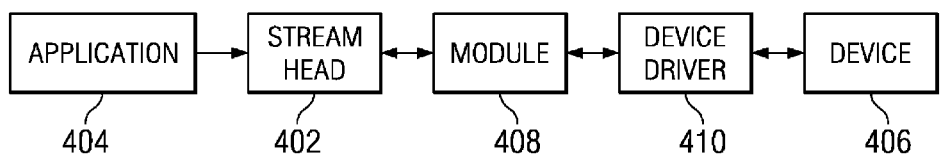
FIG. 4 is a block diagram illustrating a stream architecture in accordance with an illustrative embodiment.

Turning now to FIG. 4, a block diagram illustrating a stream architecture device driver is shown in accordance with an illustrative embodiment. Device driver 400 may be implemented as any type of device driver that transmits data along a chain of two or more modules to enable communication between an application and a device. In this example, device driver 400 is a stream architecture device driver.

Stream head 402 is a first software module in device driver 400. Stream head 402 receives data or a message from process 404. Process 404 is a process running on a workload partition, such as process 320 in FIG. 3. Process 404 wants to utilize device 406. Process 404 may want to output data to device 406, receive data from device 406, and/or utilize device 406 to perform any other function of device 406.

Device 406 is a terminal device. For example, device 406 may be, but is not limited to, a printer, a display device, a network device, a secondary data storage device, or any other type of device. A network device is any type of network access hardware and/or software known or available for allowing a computing device to access a network. The network device connects to a network connection, such as network 102 in FIG. 1. The network connection permits access to any type of network, such as a local area network (LAN), a wide area network (WAN), or the Internet.

A secondary data storage device is a device for storing data, such as a flash memory, a memory stick, a floppy disk, a tape drive, an optical disk drive, a compact disk (CD) drive, a compact disk rewritable (CD-RW) drive, or any other type of secondary data storage.

A display device is any type of device for displaying data to a user. A display device may include, without limitation, a cathode ray tube (CRT) monitor, a liquid crystal display (LCD) monitor, a plasma screen, a touch screen, or any other type of display device.

When process 404 wants device 406 to perform a function, process 404 sends a message or data to stream head 402. Stream head 402 then sends the message down a chain of modules associated with device driver 400 to initiate the desired action in device. For example, if process 404 wants to send data to a network device for transmission over the internet, process 404 transmits data regarding the request to stream head 402 in device driver 400 for a network device. Stream head 402 is a first module in a module chain connecting process 404 with device 406. Stream head 404 sends the data to a next module in the chain. The next module may be a module such as module 408 or stream head 404 may send the data directly to device driver module 410.

Module 408 is a software component of device driver 400. Module 408 may perform a function with respect to the data received from stream head 402. For example, module 408 may be, without limitation, a code module that translates the output in the message from one language to another. A code module could translate output in English to French so that the output will be displayed on device 406 in French. The code module passes the data to device driver module 410 for display on a console or other display device.

Module 408 may also be, without limitation, a protocol module that packages output data in accordance with the TCP/IP protocol for transmission by a network device over a network. The protocol module packages the data as a TCP/IP data packet and transmits the data packet to device driver module 410 for transmission over the network. Module 408 may be a protocol conversion module that opens a network connection for transmission of data over the network. Module 408 may also be a format module that formats data for transmission to a printer for printing. The format module sends the formatted data to device driver module 410 for transmission to a printer.

Device driver module 410 is the software component that communicates or interacts directly with device 410. Thus, device driver module 410 is the last module in the chain of modules in device driver 400. Device driver module 410 sends data to device 406 to prompt device 406 to take the action desired by process 404.

In this example, device driver 400 includes a stream head 402, a device driver module 410 and a single module 408 in the chain. However, device driver 400 may include any number of modules in the chain. For example, device driver 400 could include stream head 402, module 408, a second module, a third module, and then device driver module 410.

In one example, process 404 is a process associated with a web browser application. In this example, process 404 wants to send a request for data over the Internet, such as a request for a web page. Process 404 sends the request to stream head 402 in a message. Stream head 402 sends the message with the web page request to module 408. In this example, module 408 is a protocol module that packages the data in accordance with the Transfer Control Protocol/Internet Protocol (TCP/IP) protocol for transmission over the internet. Module 408 sends the TCP/IP request to a next module in the chain or to device driver module 410. In this manner, the web page request is sent from process 404 down a chain of modules until device driver module 410 is reached.

In this example, device driver module 410 is a network device driver that communicates/interacts directly with the network device. When device driver module 410 receives the message with the data packet having the web page request for transmission over the network, the device driver prompts the network device to transmit the data packet to the intended recipient over the network. In this case, the intended recipient is a web page server having the web page requested by process 404.

Each module in device driver 400 has a state. For example, if module 408 is a protocol conversion module, module 408 would have a state indicating if a network connection is open or closed. If the connection is open, the state indicates if the network connection is open but not connected or if the network connection is open and currently connected. Information regarding the state of each module in the chain is referred to as state data.

During a checkpoint process, a checkpoint gathers state information regarding the internal state of each module in device driver 400. In the example above, if a module is a protocol conversion module, the state may indicate, for example and without limitation, that the module is "open and connected;" "open and unconnected;" or "closed." Currently available checkpoint processes are not able to gather checkpoint data if a network connection is open. The checkpoint cannot gather checkpoint data until the network connection is closed. However, the illustrative embodiments provide a checkpoint that saves checkpoint information regarding the internal state of device driver modules even when a network connection is open.

The checkpoint saves the state information in a state file, such as state file 330 in FIG. 3 for use in restoring each module during a restore operation, such as when a workload partition associated with the protocol conversion module is migrated to a different computing device.

The checkpoint must also save state data regarding the external state of each module. The external state of a module is information regarding the state of "in-flight" messages that have been sent by a module but not yet received by the intended recipient. In other words, when a module sends a message to another module, the module passes the message to the operating system. The operating system then delivers the message to the intended recipient module. While the operating system has the message, the message is an in-flight message. For example, when stream head 402 sends data in a message to module 408 but before the message is received by module 408, the data is an in-flight message. Therefore, the checkpoint must initiate a process to gather both internal data for each module in device driver 400 and external data for any in-flight messages sent by modules in device driver 400. In this manner, the state data saved in the state file in accordance with the illustrative embodiments includes state information for messages sent, received, and going in between modules.

A checkpoint process is associated with a process in a workload partition, such as process 404 executing in a workload partition. To perform a checkpoint in a stream architecture, the checkpoint process prompts the kernel to ask or query each module in the stream as to whether the module knows how to checkpoint. If the module knows how to checkpoint, the kernel queries each module in the stream as to whether the module is able to checkpoint. This query may be referred to as a "checkpointability" query.

If the module does not know how to checkpoint or is not able to checkpoint, the kernel will display an error message informing the user as to why the checkpoint process cannot be completed. A module may not be able to perform a checkpoint if, for example and without limitation, the module is a printer module that has a printer device open and spooling data. In this example, the application responsible for the print job cannot be migrated to a different workload partition on a different computing device until either the print job is completed and the printer closes, or until the user cancels the print job to close the printer. In such a case, the spooling print job prevents migration of the application because the printer spooling the print job is connected to the original computing device running the application. If the application is migrated to a different computing device, the printer will no longer be connected to the computing device running the migrated application. Therefore, the checkpoint process has to wait until the printer is closed before gathering state data regarding the print module.

If the module knows how to checkpoint and is able to checkpoint, then stream head 402 generates a special checkpoint message. Stream head 402 allocates the special checkpoint message with a message block for each module in the stream. In this example, the special checkpoint message will include a checkpoint header block and three module message blocks, one message block for stream head 402, one message block for module 408, and one message block for device driver module 410. The special checkpoint message block is discussed in greater detail in FIG. 5 below.

Figure 5:
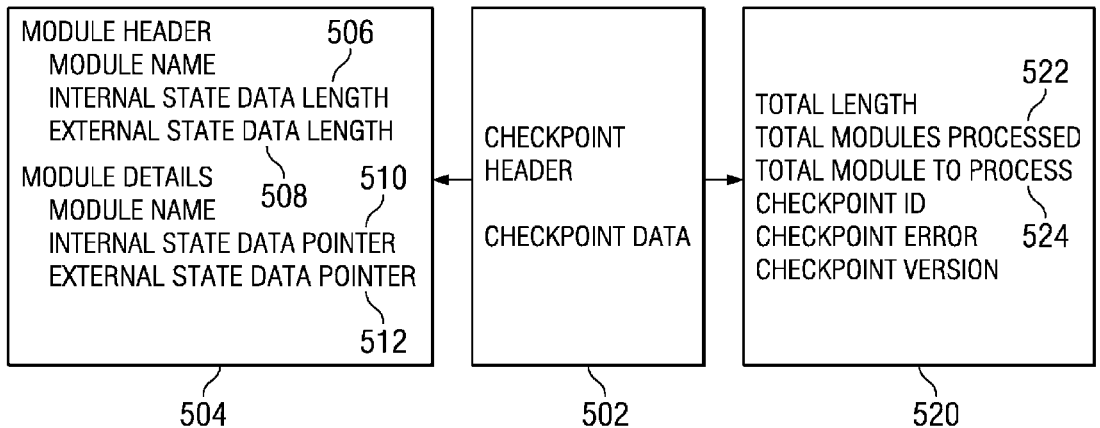
FIG. 5 is a block diagram illustrating a checkpoint/restart message in accordance with an illustrative embodiment.

FIG. 5 is a block diagram illustrating a checkpoint/restart message in accordance with an illustrative embodiment. Checkpoint message 500 is a message allocated by a stream header module, such as stream header 402 in FIG. 4. Checkpoint message 500 includes checkpoint header block 502. Checkpoint header block 502 provides checkpoint data for the checkpoint.

Checkpoint message 500 also includes a message block for each module in the stream, such as message block 504. Message block 504 includes a module header. The module header provides information regarding a particular module for which message block 504 is allocated. For example, the module header includes a name of the module, internal state data length 506 and external state data length 508. Internal state data is data regarding the internal state of a particular module. External state data is data regarding in-flight messages for the module.

Checkpoint message 500 includes module details for the module for which message block 504 is allocated. Module details may include, without limitation, the module name, a pointer to internal state data 510, and a pointer to external state data. The module for which message block 504 is allocated saves internal state data in the message block. The operating system saves data regarding in-flight messages for the module to form external data.

Checkpoint message 500 also includes status message block 520. Status message block 520 includes data describing the status of checkpoint message 500. For example, status message block 520 may include, without limitation, the total length of checkpoint message 500, the total number of modules processed thus far 522, the total number of modules to be processed before the checkpoint process will be complete 524, a checkpoint identifier, data regarding any checkpoint errors, and/or the checkpoint version.

In this example, the stream includes three modules, a stream head, a protocol module, and a device driver module. The kernel queries the stream to determine if the stream is able to be checkpointed. If the stream is able to be checkpointed, the kernel prompts the stream head to generate checkpoint message 500. The stream head allocates checkpoint header 502 and status message block 520. The stream head also allocates a message block for each module. In this case, stream head allocates message block 504 for the stream head and two additional message blocks (not shown) for the protocol module and the device driver module.

Because the modules in the stream are constantly sending messages back and forth between the modules in the stream, the stream head freezes the stream. Freezing the stream refers to suspending all communications or the sending of messages and data from one module to another module in the stream, with the exception of the checkpoint message and/or a restart message. In this example, as long as the stream is frozen, the only message that can be sent to the modules in the stream is checkpoint message 500.

After freezing the stream, the stream head module updates message block 504 with internal state data regarding the internal state of the stream head. The operating system then updates the external state data with the state of any in-flight messages. The stream head then sends a checkpoint message to the next module in the stream, which is the protocol module in this example.

The protocol module updates a message block allocated specifically to the protocol module (not shown) with internal state data describing the state of the protocol module. The operating system then updates external data in the message block for the protocol module with state data regarding any in-flight messages sent by or sent to the protocol module that have not been received by the intended recipient of the message. If the protocol module experiences any problems during this process, the protocol module sends an acknowledge "ACK" message to the stream head indicating that the checkpoint process has experienced a problem and/or failed to complete. If the protocol module does not experience any difficulties or problems, the protocol module sends checkpoint message to the device driver module.

The device driver module receives the checkpoint message and updates internal state data with data regarding the internal state of the device driver module in a message block (not shown) in checkpoint message 500 allocated specifically for the device driver module. The operating system then updates external data for the device driver module in the message block for the device driver module. When the checkpoint process is complete and the total number of modules processed 522 is equal to the total number of modules to be processed 524, the last module sends an acknowledge ("ACK") message to the stream head. Upon receiving the acknowledge message, the kernel saves the state data in checkpoint message 500 to a state file, such as state file 330 in FIG. 3. The state data in the state file may then be used to restore or migrate the applications running on the workload partition on the original computing device to the different computing device using the state data. In another embodiment, if the user wants to continue to allow the applications to resume running on the original workload partition, the stream head unfreezes the stream allowing the modules in the stream to resume sending and receiving messages in the stream. In another example, when the application and device driver are being restored on another computing device, the kernel checks for the restorability of the stream. If the stream is restorable, the kernel makes a determination as to whether the correct number of modules is present in the stream in the correct order. If the correct number and order of modules is not available and/or if the stream is not restorable, the kernel sends an error message to the user.

If the stream is restorable and the correct number and order of modules is present, the stream head allocates a restart message using the state data saved in the state file. The restart message includes checkpoint header 502, status message block 520, and a message block for each module in the stream. In this example, the restart message includes message block 504 allocated for the stream head and two other message blocks allocated for the protocol module and the device driver module. The restart message includes all the internal state data and external state data for each module that was updated during the checkpoint process. In other words, the restart message is the same or similar to checkpoint message 500 after the last module updated the internal and external data for the module in checkpoint message 500 and the checkpoint process was complete.

The stream module freezes the stream so that all communications between the modules is suspended, except for the checkpoint message and/or restart message. The stream module uses the internal data in message block 504 to update the internal state of stream module. The operating system uses the internal state data in message block 504 to restore any in-flight messages for the stream head. The stream head then passes the restart message to the protocol module. The protocol module updates the internal data of the protocol module using internal data in a message block allocated to the protocol module. The operating system updates any in-flight messages for the protocol module using the external data. The protocol module then passes the restart message to the device driver.

The device driver updates its internal data and the operating system restores any in-flight messages for the device driver module using the external data. If any problems are encountered during this process, the module experiencing the problem can send an acknowledge message to the stream head.

Otherwise, when the restore process is complete, the last component in the stream to complete updating internal data and external data sends an acknowledge message informing the stream head that the restoration process is complete. The stream head then unfreezes the stream and the stream is restarted or restored on the second computing device at the same state that the stream was in at the time of the checkpoint on the first computing device.

This example has been described as involving a protocol module and a device driver module. However, the stream described in FIG. 5 is not limited to protocol modules. The stream described in FIG. 5 may include any type of modules in the stream, including, without limitation, a protocol conversion module, a code module, a print module, a format module, or any other type of module.

Figure 6:
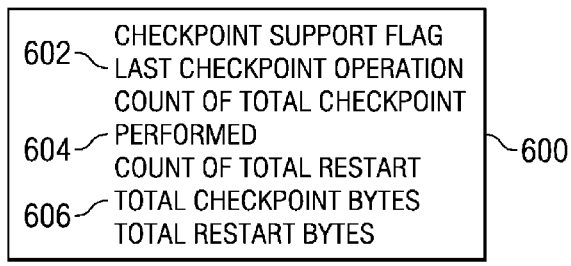
FIG. 6 is a block diagram illustrating a status message block in accordance with an illustrative embodiment.

Referring now to FIG. 6, a block diagram illustrating a status message block is depicted in accordance with an illustrative embodiment. Status message 600 is an example of a status message block, such as status message block 520 in FIG. 5. A status message block includes the checkpoint status as part of the module status.

For example, status message 600 includes information regarding checkpoint support flags, the last checkpoint operation performed 602, the count of total checkpoints performed 604, the count of total restart operations, the total checkpoint bytes used 606, and the total restart bytes used. When a checkpoint is performed, the count of total checkpoints performed 604 is incremented up. Likewise, when a restart is completed, the count of total restarts is incremented up by one. Status message 600 provides information regarding checkpoints and restarts to a user and/or to the checkpoint process for use in managing the checkpoint and restart process. For example, a user may determine that total checkpoint bytes 606 are so high that the checkpoint process is too expensive to perform for a given application. Status message 600 is updated in the checkpoint message or the restart message as the checkpoint or restart message is sent from one module to the next.

Thus, the checkpoint and restart of a stream requires the capture and restore of the internal and external state data associated with the stream. Specifically, the checkpoint process captures the state of the stream head that interacts with the application, the state of messages in-flight between the modules in the stream, and the state of the device driver module that connects to the hardware terminal.

Figure 7:
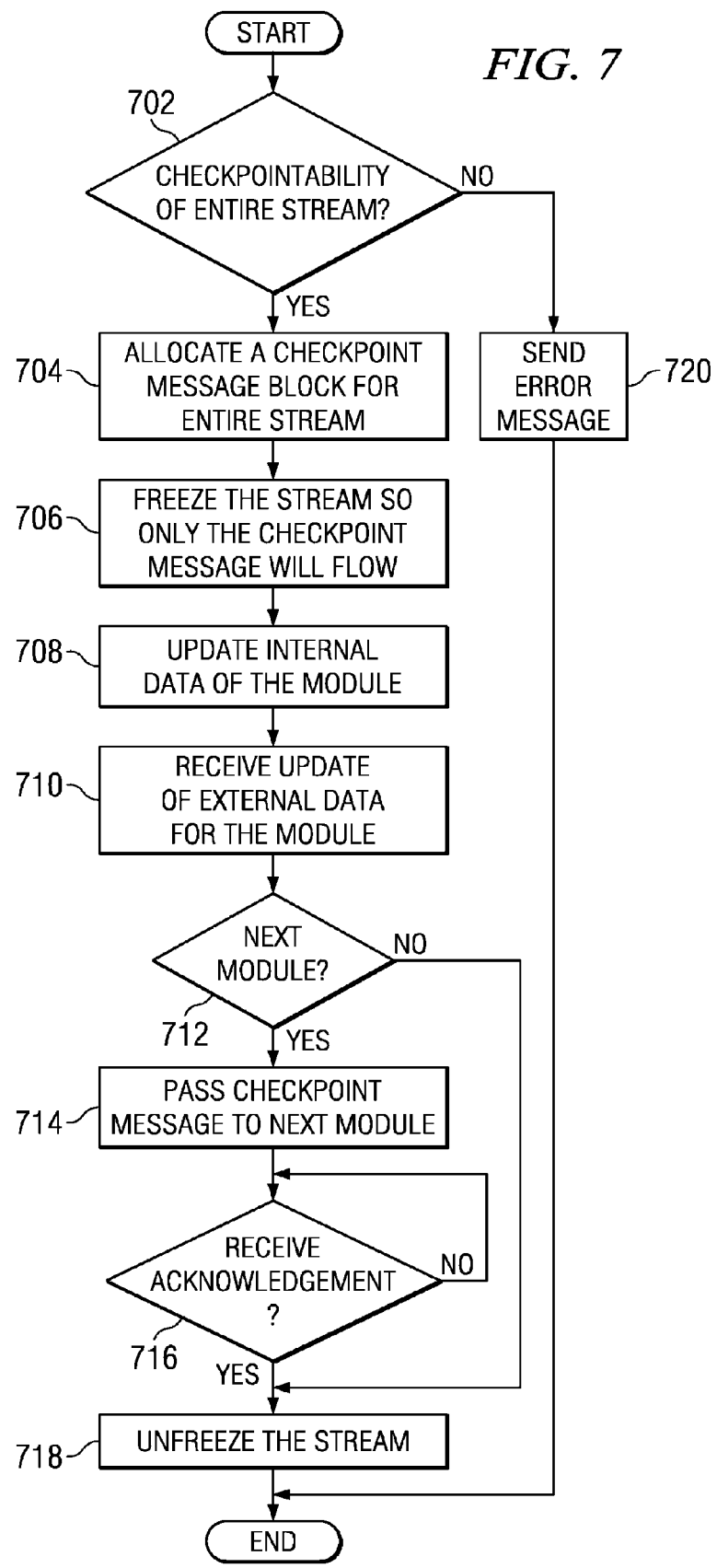
FIG. 7 is a flowchart illustrating a process for a stream head generating a checkpoint message in accordance with an illustrative embodiment.

FIG. 7 is a flowchart illustrating a process for a stream head generating a checkpoint message in accordance with an illustrative embodiment. The process in FIG. 7 may be implemented by a module in a device driver, such as stream head 402 in FIG. 4.

The process begins by the stream head module making a determination as to whether the entire stream is able to be checkpointed (step 702). This objective may be performed by checking the checkpoint state associated with each queue. If the entire stream is not able to be checkpointed, that is, if all the modules in the stream cannot perform a checkpoint, then the module sends an error message (step 702) indicating that a checkpoint process cannot be performed.

Returning to step 702, if the entire stream is checkpoint able, then the stream head module allocates a checkpoint message block, such as checkpoint message 500 in FIG. 5, for the entire stream (step 704). The checkpoint message block can contain the checkpoint information of the entire stream. The checkpoint message block will include a checkpoint header and a message block for each module in the stream.

The stream head module then freezes the stream so that only the checkpoint message will flow between the modules (step 706). In other words, all communication between the modules is suspended with the exception of the checkpoint message. This frozen state is a special state of the stream in which only the checkpoint message will flow between the modules.

The stream head module then updates the internal data of the module (step 708). The stream head module receives an update of external data for in-flight messages associated with the module from the operating system (step 710). The update of the external data is performed by the operating system.

The stream head module makes a determination as to whether a next module is in the stream (step 712). If a next module is in the stream, the stream head module sends the checkpoint message to the next module (Step 714).

In this example, after the stream head passes the checkpoint message to the next model in the stream, each module in the stream will update their respective checkpoint data and also the checkpoint status in the checkpoint message. If the checkpoint does not encounter any problems, each module will then pass the checkpoint message to the next module in the chain until the last module receives the checkpoint message, updates, and sends an acknowledge message back to the stream head.

Returning to step 714, the stream head module makes a determination as to whether an acknowledge message is received (step 716) indicating that the checkpoint process is complete or that a problem was encountered by one of the modules in the stream that prevents the checkpoint process from completing. If an acknowledge message is not received, the process returns to step 716 and waits until an acknowledge message is received. When the acknowledge message is received at step 716 indicating that the checkpoint is complete, the stream head module unfreezes the stream to allow the modules to pass messages between the modules (step 718) with the process terminating thereafter. The checkpoint data is then saved by the kernel into a state file in a data storage device or stored in a buffer. This checkpoint data is later used during the restart process to restore the state of the stream on a new workload partition on the different computing device after migration of the workload partition.

In another embodiment, when an acknowledge message is received indicating the checkpoint process is complete, the stream head may not unfreeze the stream because the user may not wish to continue running the application in the original workload partition. The user may prefer to discontinue execution of the application in the original workload partition because the application is being migrated to a new computing device. Therefore, unfreezing the stream may be unnecessary.

Turning now to FIG. 8, a flowchart illustrating a process for a module updating checkpoint data in a checkpoint message is depicted in accordance with an illustrative embodiment. The process in FIG. 8 may be implemented by a module in a device driver, such as module 404 in FIG. 4.

The process begins when a module in the stream receives a checkpoint message (step 802). The module updates internal data for the module (step 804) in the checkpoint message block allocated to the module. The module detects an update of external data for the module (step 806) by the operating system. The operating system updates external data in the message block allocated to the module regarding in-flight messages sent by the module or intended to be received by the module. The module then makes a determination as to whether any problems have been encountered during the checkpoint process (step 808). If a problem is detected, the module sends an acknowledge message "ACK" to the stream head to indicate that the checkpoint process was unable to complete. The process terminates thereafter.

Returning to step 808, if no problem is encountered, the module makes a determination as to whether a next module is in the stream (step 812). The module may make this determination by checking status data in the status message block in the checkpoint message. If a next module is not in the stream, the module sends an acknowledge message to the stream head indicating that the checkpoint process is complete (step 810). The process terminates thereafter.

Returning to step 812, if a next module is in the stream, the module passes the checkpoint message to the next module (step 814). The process terminates thereafter.

Figure 9:
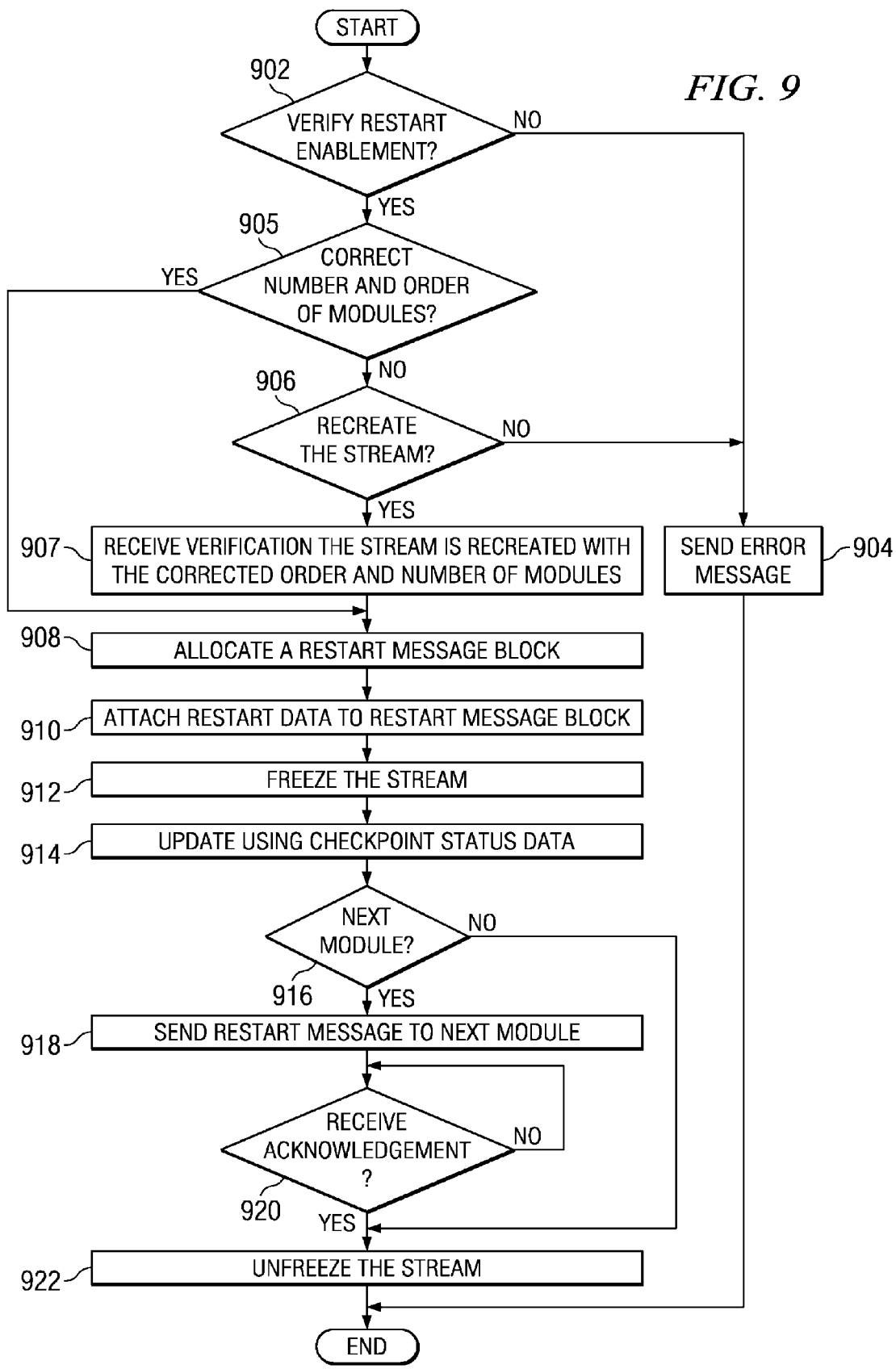
FIG. 9 is a flowchart illustrating a process for a stream head performing a restart in accordance with an illustrative embodiment.

FIG. 9 is a flowchart illustrating a process for a stream head performing a restart in accordance with an illustrative embodiment. The process in FIG. 9 may be implemented by a module in a device driver, such as stream head 402 in FIG. 4. The application which is restarting the stream provides the state file or the state data in a buffer created by the checkpoint process illustrated in FIGS. 7 and 8 above. The checkpoint state data is passed to the stream head in the same format as checkpoint message 500 in FIG. 5. The state file may be retrieved by the application from a remote data storage device over a network or from a local data storage device.

The process begins when the stream head verifies the stream is able to restart (step 902). If the stream is not able to be restarted, such as, without limitation, due to corruption in the checkpoint state data or unavailability of the checkpoint state data, the stream head sends an error message (step 904) to the kernel indicating that restart failed.

Returning to step 902, if the restart is enabled, the stream head determines whether the correct number of modules are present and whether the modules in the stream are located in the correct order (step 905). In other words, the stream head verifies that the modules are located at the correct location by matching the module name with provided checkpoint data. If the correct number and order of modules is not present, the stream head makes a determination as to whether the stream can be recreated with the correct number of modules in the correct order (step 906). If the stream can be recreated, the stream head receives verification that the stream has been recreated with the correct number of modules in the correct order (step 907). If the stream cannot be recreated at step 906, the stream head sends an error message (step 904).

Returning to step 905, if the correct number and order of modules is present, the stream head allocates a restart message block (step 908) and attaches the restart state data from the state file for the workload partition associated with the stream to the restart message block (step 910). The stream head freezes the stream so that only the restart message can be sent between the modules. In other words, in this frozen state, all communications between the modules is suspended with the exception of the restart message.

The stream head updates internal data using the checkpoint status data (step 914). The external data is updated by the operating system. The stream head then makes a determination as to whether a next module is in the stream (step 916). If a next module is in the stream, the stream head sends the restart message to the next module in the stream (step 918). The stream head then waits to receive an acknowledgment that the restart process is complete (step 920). After receiving the acknowledgment message at step 920 or if a next module is not in the stream at step 916, the stream head unfreezes the stream to permit the modules to send messages between the modules in the stream. The process terminates thereafter.

In this example, when the stream head sends the restart message to the next module, each module in the chain receives the restart message, takes the restart action, updates the checkpoint status data, and then sends the restart message to the next module in the chain. The last module in the chain sends the restart acknowledge message "ACK" to the stream head to acknowledge that the restart process is complete. If any module cannot perform the restart operation, the module sends the acknowledge message to the stream head to indicate that the restart operation did not complete.

Referring now to FIG. 10, a flowchart illustrating a process for a module using checkpoint data in a restart message to restore the module is shown in accordance with an illustrative embodiment. The process in FIG. 10 may be implemented by a module in a device driver, such as module 404 in FIG. 4.

The process begins when a module receives a restart message (step 1002). The module updates internal data using restart data in the message block of the restart message allocated to the module (step 1004). The external data for the module is updated by the operating system. In other words, the in-flight messages associated with the module are restored by the operating system using external data for the module that is provided by the restart message.

The module makes a determination as to whether any problems are encountered during the restart process (step 1006). If no problem is encountered, the module makes a determination as to whether a next module is in the stream (step 1008) that still needs to update with restart data in the restart message. If a next module is in the stream, the module sends the restart message to the next module (step 1010). The process terminates thereafter.

Returning to step 1008, if a next module is not in the stream, the module sends an acknowledge message to the stream head indicating that the restart process is complete (step 1012). The process terminates thereafter.

Returning to step 1006, if a problem is encountered, the module sends an acknowledge message indicating that restart was not successful (step 1012). The process terminates thereafter.

Thus, the illustrative embodiments provide a computer implemented method, apparatus, and computer program product for a checkpoint process associated with a device driver in a workload partitioned environment. In response to a checkpoint process being initiated, a stream between a set of kernel modules associated with a device driver is frozen. Freezing the stream prevents any module in the set of kernel modules from sending any message except a checkpoint message to another module in the set of kernel modules. The message block for each module in the set of kernel modules is updated with internal data to form a restart message. The internal data is data regarding a state of the module in the set of kernel modules. The restart message is used to restart the stream and the set of kernel modules when the workload partition is migrated to a different data processing system.

The illustrative embodiments are applicable to any product using streams technology or architecture like streams for performing checkpoint and restart of the set of kernel modules associated with a device driver for driving a device.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk, millipede storage technology, Magnetoresistive random access memory (MRAM), or phase-change memory, also known as PCM, PRAM, Ovonic Unified Memory, and Chalcogenide RAM (C-RAM). Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for a checkpoint process associated with a device driver in a workload partitioned environment, the computer implemented method comprising:
    responsive to initiation of the checkpoint process in a workload partition in the workload partitioned environment, freezing a stream between a plurality of kernel modules within the device driver associated with a device used by the workload partition in a first data processing system to prevent any module in the plurality of kernel modules within the device driver from sending any messages, other than a checkpoint message, to another module in the plurality of kernel modules;
    updating a message block allocated for each module in the plurality of kernel modules within the device driver with internal data describing a state of each module and external data describing a state of in-flight messages sent between the plurality of kernel modules that were not received by intended recipient modules in the plurality of kernel modules when the checkpoint process was initiated to form a restart message;
    restarting the stream and the plurality of kernel modules on a second data processing system using the restart message; and
    responsive to a determination that the stream is able to restart, determining whether a correct number of modules in the plurality of kernel modules within the device driver is present and in a correct order.

2. The computer implemented method of claim 1 further comprising:
    allocating, by a stream head module in the plurality of kernel modules, the checkpoint message, wherein the message block is allocated for each module in the plurality of kernel modules to form the checkpoint message.

3. The computer implemented method of claim 1 further comprising:
    responsive to a module in the plurality of kernel modules being unable to update an associated message block in the checkpoint message with the internal data to form the restart message, sending a message to a kernel indicating that the checkpoint process failed.

4. The computer implemented method of claim 1 further comprising:
    responsive to receiving a message indicating that the checkpoint process is complete, unfreezing the stream, wherein unfreezing the stream allows modules in the plurality of kernel modules to send messages, other than the checkpoint message, between the modules.

5. The computer implemented method of claim 1 wherein restarting the stream and the plurality of kernel modules further comprises:
    freezing the stream between the plurality of kernel modules, wherein freezing the stream prevents any module in the plurality of kernel modules from sending any message except the restart message to another module in the plurality of kernel modules;

updating the state of each module in the plurality of kernel modules using the internal data for the each module provided by the restart message; and unfreezing the stream, wherein unfreezing the stream allows modules in the plurality of kernel modules to send messages, other than the restart message and the checkpoint message, between the modules.

6. The computer implemented method of claim 1 further comprising:

responsive to the correct number of modules in the plurality of kernel modules within the device driver being present and in the correct order, allocating the restart message and updating the restart message with state data for each module in the plurality of kernel modules, by a stream head module in the plurality of kernel modules, wherein a message block is allocated to the restart message for each module in the plurality of kernel modules to form the restart message, and wherein the state data comprises the internal data and the external data for each module in the plurality of kernel modules.

7. The computer implemented method of claim 6 further comprising:

providing, by an application restarting the stream, the state data for each module in the plurality of kernel modules, wherein the state data is used to update the restart message.

8. A computer program product comprising:

a non-transitory computer usable medium including computer usable program code for a checkpoint process associated with a device driver in a workload partitioned environment, said computer program product comprising:

computer usable program code for freezing a stream between a plurality of kernel modules within the device driver associated with a device used by a workload partition in a first data processing system to prevent any module in the plurality of kernel modules within the driver device from sending any message, except a checkpoint message, to another module in the plurality of kernel modules in response to an initiation of the checkpoint process in the workload partition in the workload partitioned environment;

computer usable program code for updating a message block allocated for each module in the plurality of kernel modules within the device driver with internal data describing a state of each module and external data describing a state of in-flight messages sent between the plurality of kernel modules that were not received by intended recipient modules in the plurality of kernel modules when the checkpoint process was initiated to form a restart message;

computer usable program code for restarting the stream and the plurality of kernel modules on a second data processing system using the restart message; and computer usable program code for determining whether a correct number of modules in the plurality of kernel modules is present and in a correct order in response to a determination that the stream is able to restart.

9. The computer program product of claim 8 further comprising:

computer usable program code for allocating, by a stream head module in the plurality of kernel modules, the checkpoint message, wherein the message block is allocated for each module in the plurality of kernel modules to form the checkpoint message.

10. The computer program product of claim 8 further comprising:

computer usable program code for sending a message to a kernel indicating that the checkpoint process failed in response to a module in the plurality of kernel modules being unable to update an associated message block in the checkpoint message with internal data to form the restart message.

11. The computer program product of claim 8 further comprising:

computer usable program code for unfreezing the stream in response to receiving a message indicating that the checkpoint process is complete, wherein unfreezing the stream allows modules in the plurality of kernel modules to send messages, other than the checkpoint message, between the modules.

12. The computer program product of claim 8 wherein restarting the stream and the plurality of kernel modules further comprises:

computer usable program code for freezing the stream between the plurality of kernel modules to prevent any module in the plurality of kernel modules from sending any messages, other than the restart message, to another module in the plurality of kernel modules;

computer usable program code for updating the state of each module in the plurality of kernel modules using the internal data for each module provided by the restart message; and computer usable program code for unfreezing the stream, wherein unfreezing the stream allows modules in the plurality of kernel modules to send messages, other than the restart message and the checkpoint message, between the modules.

13. The computer program product of claim 8 further comprising:

computer usable program code for allocating the restart message and updating the restart message with state data for each module in the plurality of kernel modules, by a stream head module in the plurality of kernel modules, in response to the correct number of modules in the plurality of kernel modules being present and in the correct order, wherein a message block is allocated for the each module in the plurality of kernel modules to form the restart message, and wherein the state data includes the internal data and the external data for each module in the plurality of kernel modules.

14. The computer program product of claim 13 further comprising:

computer usable program code for providing, by an application restarting the stream, the state data for each module in the plurality of kernel modules, wherein the state data is used to update the restart message with the state data.

* * * * *